UNITED STATES PATENT OFFICE.

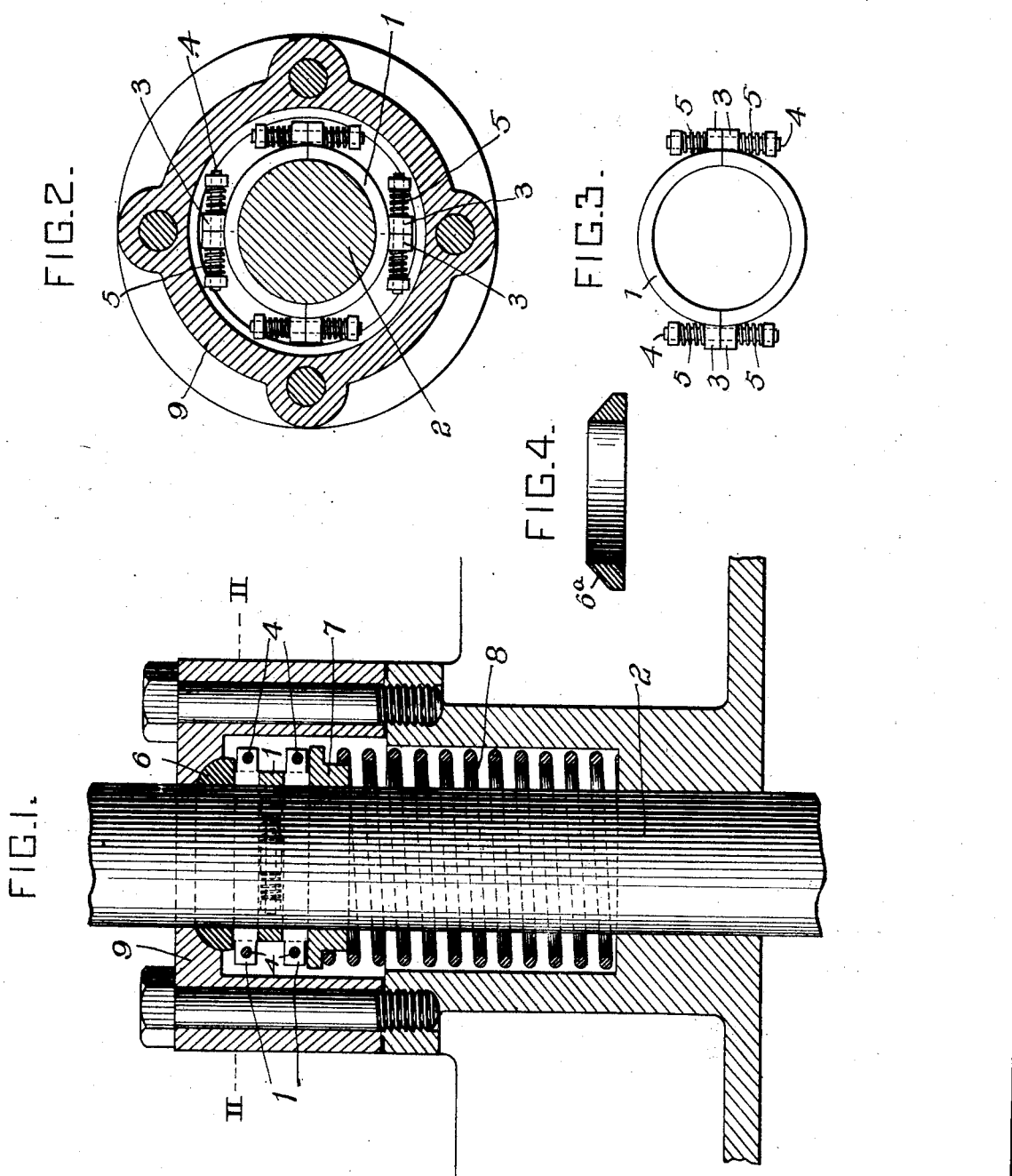

CORNWALL A. PEVERALL, OF PENN TOWNSHIP, WESTMORELAND COUNTY, PENNSYLVANIA, ASSIGNOR TO WILLIAM CLIFFORD, OF JEANNETTE, PENNSYLVANIA.

PACKING FOR PISTON-RODS.

No. 826,741.  Specification of Letters Patent.  Patented July 24, 1906.

Application filed April 22, 1905. Serial No. 256,929.

*To all whom it may concern:*

Be it known that I, CORNWALL A. PEVERALL, a citizen of the United States, residing in Penn township, in the county of Westmoreland and State of Pennsylvania, have invented or discovered certain new and useful Improvements in Packing for Piston-Rods, of which improvements the following is a specification.

The invention described herein relates to certain improvements in packing-rings for piston-rods; and it consists, generally stated, in the combination of a series of two or more sectional rings yieldingly held around the rod and yieldingly held in contact with each other.

The invention is hereinafter more fully described and claimed.

In the accompanying drawings, forming a part of this specification, Figure 1 is a sectional view of the stuffing-box of a cylinder having my improved packing applied thereto. Fig. 2 is a sectional view of the same on a plane indicated by the line II II, Fig. 1. Fig. 3 is a detailed view of the packing-rings, and Fig. 4 illustrates a modification of the abutment-ring.

In the practice of my invention I employ a series of two or more sectional packing-rings 1, so arranged around the piston-rod 2 that one ring will break joints with the other ring or rings. The sections of these rings are provided with lugs 3, through which pass pins 4, having springs 5 mounted thereon, so as to press the lugs toward each other, and thereby close the ring-sections tightly around the rod. The tension of these springs is regulated by nuts screwing onto the ends of the pins. These rings are interposed between a stationary ring-abutment 6 and a ring-follower 7. This ring-follower is forced outward by means of a spring 8, arranged around the piston-rod and preferably bearing against a flange on the ring 7. The ring 6, which is held in position by a cap 9, forms a close joint with the cap, and its bearing-face and seat in the cap are preferably made concave or convex, forming a species of ball-and-socket joint whereby a slight lateral movement of the piston-rod is permitted.

It will be observed that the springs are arranged tangentially to the ring-sections and that the pins not only serve as supports for the springs, but also as guides for the ring-sections.

I claim herein as my invention—

1. A packing for piston-rods having in combination a series of two or more sectional rings, each section being provided with radial lugs, pins passing loosely through the lugs and springs arranged around the pins and acting in opposition to each of the lugs of the section and adapted to force the sections toward each other.

2. A packing for piston-rods having in combination two or more sectional rings, springs arranged tangentially to the rings and acting in opposition to each other to force the sections toward each other, a ring-abutment, a follower-ring and a spring surrounding the piston-rod for pressing the follower-ring toward the sections.

3. The combination with a cylinder provided with a packing-box, a piston-rod, two or more sectional rings tangentially-arranged springs for forcing the sections toward the rod, a cap, a ring-abutment having a seat on the cap, a follower-ring and a spring surrounding the piston-rod and pressing the follower-ring toward the abutment.

In testimony whereof I have hereunto set my hand.

CORNWALL A. PEVERALL.

Witnesses:
W. J. MONTGOMERY,
FRED MEDARIS.